US007628572B2

(12) United States Patent  (10) Patent No.: US 7,628,572 B2
Kanczuzewski et al.  (45) Date of Patent: Dec. 8, 2009

(54) METHOD, ASSEMBLY AND DEVICE FOR RESTRAINING CARGO (75) Inventors: Thomas E. Kanczuzewski, South Bend, IN (US); John Townsend, Paw Paw, MI (US); John W. Doster, Granger, IN (US); Dean Catanzarite, South Bend, IN (US)

(73) Assignee: Logistick, Inc., South Bend, IN (US)

( * ) Notice: Subject to any disclaimer, the term of this patent is extended or adjusted under 35 U.S.C. 154(b) by 436 days.

(21) Appl. No.: 11/644,605

(22) Filed: Dec. 22, 2006

(65) Prior Publication Data
US 2008/0152455 A1 Jun. 26, 2008

(51) Int. Cl.
*B61D 45/00* (2006.01)
(52) U.S. Cl. .......................... 410/152; 410/151; 410/143
(58) Field of Classification Search .................. 410/152, 410/143, 153, 127, 122, 144, 121; 248/200.1, 248/205.3, 298.1, 254, 261, 264
See application file for complete search history.

(56) References Cited

U.S. PATENT DOCUMENTS

| 969,002 | A |   | 8/1910  | Teachout          |
|---------|---|---|---------|-------------------|
| 1,238,874 | A | * | 9/1917  | Biela ........................... 410/143 |
| 1,401,419 | A |   | 12/1921 | Mcnally           |
| 1,951,660 | A |   | 3/1934  | Klaudt            |
| 2,124,082 | A |   | 7/1938  | Reifer            |
| 2,414,160 | A |   | 1/1947  | Moon              |
| 2,464,080 | A |   | 3/1949  | Hankins           |
| 2,467,681 | A |   | 4/1949  | McKinney          |
| 2,468,101 | A |   | 4/1949  | Nampa             |
| 2,697,631 | A |   | 12/1954 | Miller            |
| 2,752,864 | A |   | 7/1956  | McDougal, Sr. et al. |
| 2,766,704 | A |   | 10/1956 | McMahon           |
| 2,845,245 | A |   | 5/1958  | Gray et al.       |
| 2,912,939 | A |   | 11/1959 | Miner, Jr. et al. |
| 2,980,037 | A |   | 4/1961  | Elsner            |
| 2,993,708 | A |   | 7/1961  | Holman, Jr.       |
| 3,090,600 | A | * | 5/1963  | Smith .......................... 410/151 |
| 3,177,007 | A |   | 4/1965  | Oren              |

(Continued)

FOREIGN PATENT DOCUMENTS

GB            1209255        10/1970

*Primary Examiner*—Patricia L Engle
(74) *Attorney, Agent, or Firm*—Barnes & Thornburg LLP (57) ABSTRACT A method, assembly and device for restraining cargo in a shipping vehicle or other container with an adjustable cargo bar assembly comprising an adjustable metal bar having, a pair of ends and a flange secured to each end. The method including securing one cargo restraint device to a wall of the container with an adhesive; securing another cargo restraint device to another wall of the container with an adhesive; adjusting the length of the adjustable bar of the cargo bar assembly to a desired length; engaging the one cargo restraint device and one end of the adjustable bar of the cargo bar assembly by disposing the flange secured to the one end within a pocket defined by the one cargo restraint device; and engaging the other cargo restraint device and the other end of the adjustable bar of the cargo bar assembly by disposing the flange secured to the other end within a pocket defined by the other cargo restraint device. The method also including adjusting the length of the adjustable metal bar by increasing its length to increase pressure on the walls of the container.

23 Claims, 5 Drawing Sheets

U.S. PATENT DOCUMENTS

| | | |
|---|---|---|
| 3,344,750 A | 10/1967 | Kostrewa |
| 3,559,591 A | 2/1971 | Breen et al. |
| 3,590,746 A | 7/1971 | Gibson |
| 3,712,663 A | 1/1973 | Laven |
| 3,738,650 A * | 6/1973 | Ossenkop et al. ............. 482/40 |
| 3,836,174 A | 9/1974 | Holman, Jr. |
| 3,995,565 A | 12/1976 | Kersey |
| 4,026,508 A | 5/1977 | Ziegler |
| 4,080,906 A | 3/1978 | Brown |
| 4,264,251 A | 4/1981 | Blatt |
| 4,278,376 A | 7/1981 | Hunter |
| 4,396,325 A | 8/1983 | Joice-Cavanagh |
| 4,432,678 A | 2/1984 | Liebel |
| 4,473,225 A * | 9/1984 | Miller ........................ 482/40 |
| 4,498,824 A | 2/1985 | Kinkle |
| 4,616,757 A | 10/1986 | Hobson |
| 4,700,918 A | 10/1987 | Andrasko, Jr. |
| 4,735,468 A | 4/1988 | Taylor, Jr. et al. |
| 4,756,498 A | 7/1988 | Frye |
| 4,830,558 A | 5/1989 | Sweeney |
| 4,846,610 A | 7/1989 | Schoenleben |
| 4,880,342 A | 11/1989 | Pradovic |
| 4,932,817 A | 6/1990 | Mattare |
| 4,955,771 A | 9/1990 | Bott |
| 4,962,907 A | 10/1990 | Gary |
| 4,982,922 A | 1/1991 | Krause |
| 5,028,184 A | 7/1991 | Krause |
| 5,037,256 A * | 8/1991 | Schroeder ................... 410/143 |
| 5,104,269 A * | 4/1992 | Hardison .................... 410/149 |
| 5,156,110 A | 10/1992 | Fuller |
| 5,219,251 A | 6/1993 | Kanczuzewski |
| 5,259,712 A | 11/1993 | Wayne |
| 5,281,063 A | 1/1994 | Austin, III |
| 5,320,464 A * | 6/1994 | Long et al. ................. 410/144 |
| 5,326,204 A * | 7/1994 | Carlson et al. ............. 410/143 |
| 5,362,184 A | 11/1994 | Hull et al. |
| 5,370,482 A | 12/1994 | Long |
| 5,494,389 A * | 2/1996 | Kanczuzewski ............. 410/144 |
| 5,688,087 A | 11/1997 | Stapleton et al. |
| 5,807,047 A * | 9/1998 | Cox .......................... 410/152 |
| 6,068,228 A * | 5/2000 | Kobayashi et al. ....... 248/309.1 |
| 6,074,143 A * | 6/2000 | Langston et al. ............. 410/89 |
| 6,086,299 A | 7/2000 | Kanczuzewski |
| 6,419,434 B1 * | 7/2002 | Rahn ......................... 410/151 |
| 6,454,501 B1 * | 9/2002 | Parker ....................... 410/149 |
| 6,533,513 B2 * | 3/2003 | Kanczuzewski et al. ..... 410/152 |
| 6,572,063 B1 * | 6/2003 | Gitelman et al. ............ 248/314 |
| 6,874,982 B2 * | 4/2005 | Rhodes ....................... 410/152 |
| 6,942,004 B2 * | 9/2005 | Whittemore .............. 160/368.1 |
| 7,037,055 B1 * | 5/2006 | Rogers et al. .................. 410/9 |
| 7,134,820 B2 * | 11/2006 | Ehrlich ....................... 410/150 |
| 7,334,973 B2 * | 2/2008 | Scott ......................... 410/151 |
| 2002/0071733 A1 * | 6/2002 | Parker ....................... 410/121 |
| 2002/0176759 A1 * | 11/2002 | Kanczuzewski et al. ..... 410/152 |
| 2004/0156692 A1 * | 8/2004 | Rhodes ....................... 410/152 |

* cited by examiner

METHOD, ASSEMBLY AND DEVICE FOR RESTRAINING CARGO

The present invention relates generally to a method, assembly and device for restraining cargo within a container.

BACKGROUND

Cargo transported for commercial and other uses is often shipped in semi-trailers or other trucks, railcars, ships, aircraft or other shipping vehicles. In most instances, shifting or translation of cargo within the shipping vehicle can occur during shipping which can lead to damage. U.S. Pat. Nos. 6,533,513, 6,086,299 and 5,494,389, disclose cargo retention devices that have been well received in the shipping industry. A pair of such cargo retention devices may be secured on opposed walls of the shipping vehicle, and a wood beam, such as a 4"×4" or 2"×4" or the like, is positioned across the bed of the shipping vehicle and engaged with the cargo retention devices to secure cargo.

Another known means for retaining cargo is to secure an adjustable cargo bar assembly to the opposed walls of the shipping vehicle. Such devices typically include a metal bar, adjustable in length, and a rubber flange at each end of the bar. The bar may be in the form of a pair of telescoping pieces and structure is included for releasably locking the pieces at the desired position to achieve the desired length. The adjustable metal bars are placed into position and then expanded against the walls of the shipping vehicle to apply pressure between the rubber flanges and the walls. This mechanically-created pressure tends to hold the adjustable bar in place by friction. During shipping, however, the walls of the shipping vehicle can move, deflect or shift, which relieves the pressure and thus reduces the cargo retention performance of the adjustable cargo bar assembly.

SUMMARY

The present disclosure is directed to a method, assembly and device for restraining cargo in a shipping vehicle or other container with an adjustable cargo bar assembly comprising an adjustable metal bar having a pair of ends and a flange secured to one end. The method includes: securing a cargo restraint device to a wall of the container with an adhesive; adjusting the length of the adjustable metal bar of the cargo bar assembly to a desired length; engaging the cargo restraint device and the one end of the adjustable metal bar of the cargo bar assembly by disposing the flange secured to the one end within a pocket defined by the cargo restraint device; and engaging the other end of the adjustable bar with an other wall of the container. The adjustable cargo bar assembly may further comprise a flange secured to the other end of the adjustable metal bar and the engaging of the other end of the adjustable bar with the other wall of the container may include: securing an other cargo restraint device to the other wall of the container with an adhesive; and engaging the other cargo restraint device and the other end of the adjustable metal bar of the cargo bar assembly by disposing the flange secured to the other end within a pocket defined by the other cargo restraint device.

The method may also include thereafter adjusting the length of the adjustable metal bar by increasing its length to increase pressure on the walls of the container. The cargo restraint assembly in accordance with the present disclosure comprises the adjustable cargo bar assembly and the pair of the cargo restraint devices used in connection with the method described above. The adjustable cargo bar assembly may be a commercially available assembly or any other suitable assembly, and may instead include an adjustable bar comprised of a non-metal material.

Features and advantages of the disclosure will be set forth in part in the description which follows and the accompanying drawings described below, wherein an embodiment of the disclosure is described and shown, and in part will become apparent upon examination of the following detailed description taken in conjunction with the accompanying drawings.

DETAILED DESCRIPTION

Figure 1:
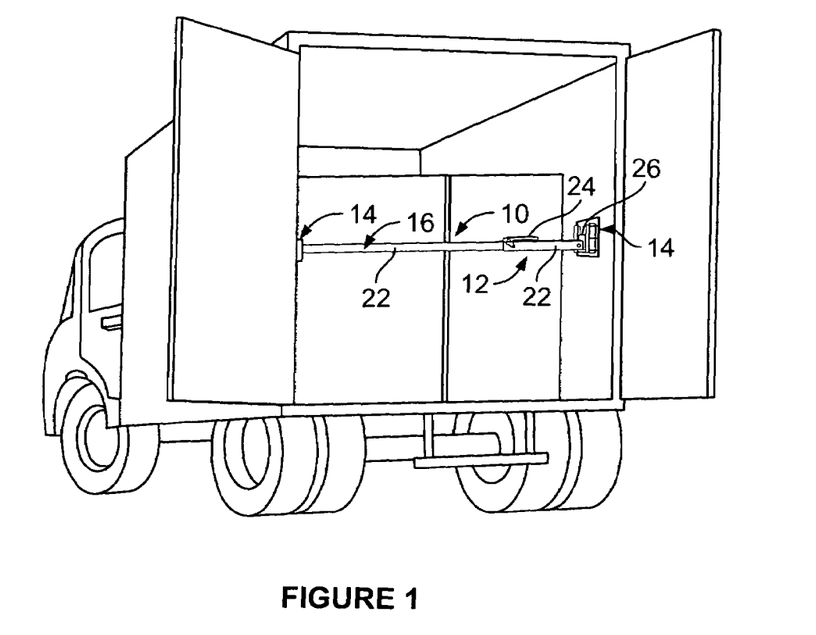
FIG. 1 is a perspective view of a cargo restraint assembly including a pair of cargo restraint devices in accordance with the present disclosure and a cargo bar assembly having an adjustable metal bar and a pair of flanges restraining cargo in a truck.

FIG. 1 illustrates a cargo restraint assembly 10 restraining cargo in a truck. The cargo restraint assembly 10 includes a cargo bar assembly 12 and a pair of cargo restraint devices 14 in accordance with an illustrated embodiment of the present disclosure. The cargo bar assembly 12 comprises an adjustable metal bar 16, structure for adjusting the length of the adjustable metal bar in the form of a pair of telescoping pieces 22 and a releasable lock 24, and a pair of flanges 26, one flange at each end of the adjustable metal bar. The pair of cargo restraint devices 14 are secured to opposed walls of the truck and are engaged with the cargo bar assembly 12, with the adjustable metal bar 16 of the cargo bar assembly 10 extending across the bed of the truck. The cargo restraint assembly 10 in accordance with the present disclosure can be used for limiting the shifting of cargo being transported by or within the truck, or by or within any other shipping vehicle or other container, such as, for example, any type of railcar, ship or aircraft or other shipping vehicle.

Each cargo restraint device 14 may have any suitable construction. As illustrated in FIGS. 2-5, for example, each cargo restraint device 14 in accordance with the illustrated embodiment of the present disclosure comprises a pad 40 including a rear surface 42 and a front surface 44, an adhesive 50 associated with the rear surface 42, and a pair or parallel retaining rails 52 and a base rail 54 disposed on the front of the cargo restraint device extending from the front surface 44 of the pad 40. The base rail 54 interconnects the bases of the retaining rails 52 to define a U-shaped pocket 60 having an open end 62 and a front opening 64 contiguous with the pocket 60. The open end 62 defined by the cargo restraint device 14 is opposite the base rail 54. When secured to the wall of the truck, the cargo restraint device 14 is oriented such that the open end 62 is at the top of the device and the base rail 54 is at the bottom of the device. As a result, the base rail 54 keeps the cargo bar assembly 12 from falling due to impact, harmonic vibration or other movement of the cargo bar assembly.

Each of the retaining rails 52 has an L-shaped cross section including a side wall 70 and a retaining wall 72 having a rear engaging surface 74 for retaining the flange 26 within the pocket 60. Each retaining rail 52 further includes a plurality of gussets 76 attached to the side walls 70 to provide lateral strength under load conditions. The number and thickness of the gussets 76 can vary depending on the load conditions applied to the cargo restraint device 14. Each cargo restraint device 14 further defines a rectangular opening 80 adjacent the side walls 70 for purposes of providing manufacturing cost benefits, and also includes a peripheral rim 82. The pad 40 may be constructed of a plastic resin or any other suitable material. The cargo restraint devices 14 may have any other suitable construction and the pockets 60, open ends 62, and front openings 64 may have any other suitable configuration and orientation in accordance with other embodiments of the present disclosure.

Figure 5:
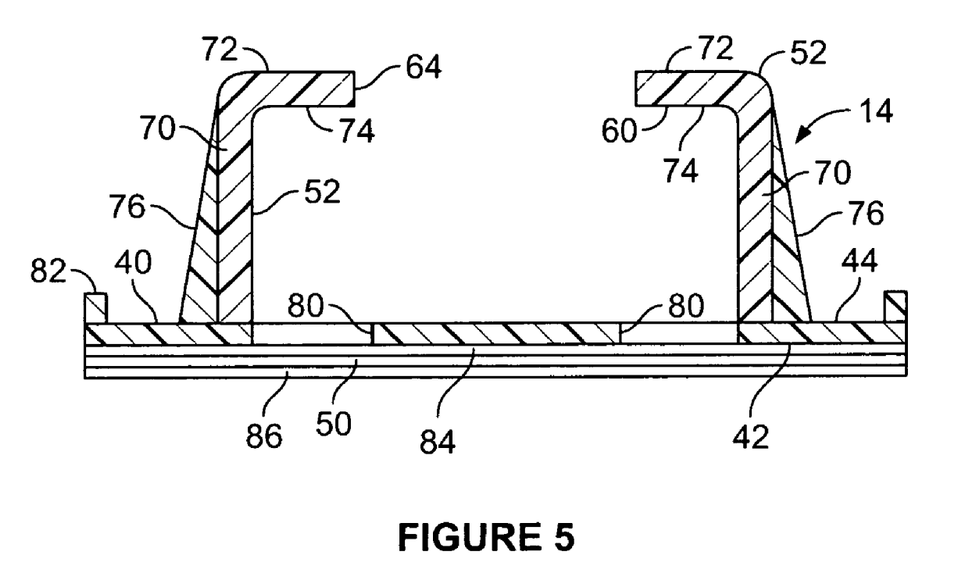
FIG. 5 is a cross section view taken along the lines 5-5 of FIG. 4.

The adhesive 50 may be in any suitable form. The adhesive 50 may, for example, be in the form of an acrylic based adhesive disposed on a neo-prene based foam 84. A removable release layer 86 may also be included. After removal of the release layer 86, the cargo restraint device 14 can be pressed against one of the walls of the container to secure it to the wall. The adhesive 50 may be instead disposed directly on the rear surface, may be in the form of a two-sided tape with a removable release layer, or may be in any other suitable form.

Figure 3:
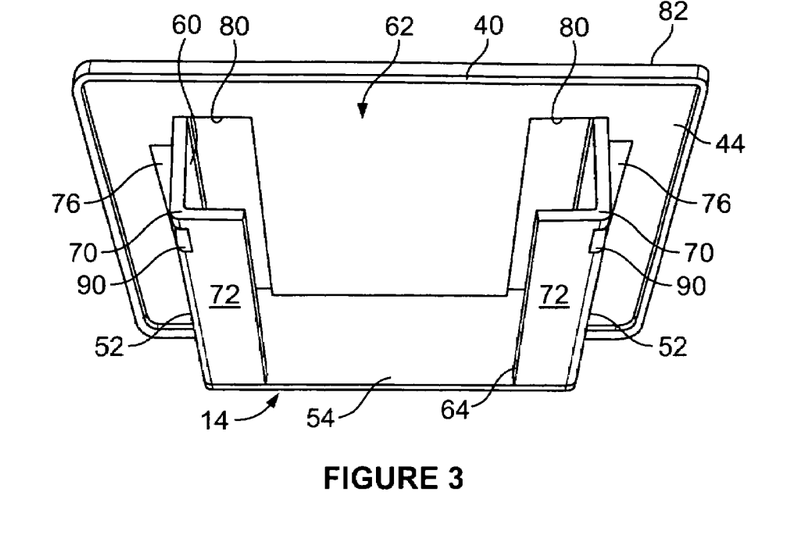
FIG. 3 is a perspective view of one of the cargo restraint devices of FIG. 1.
Figure 4:
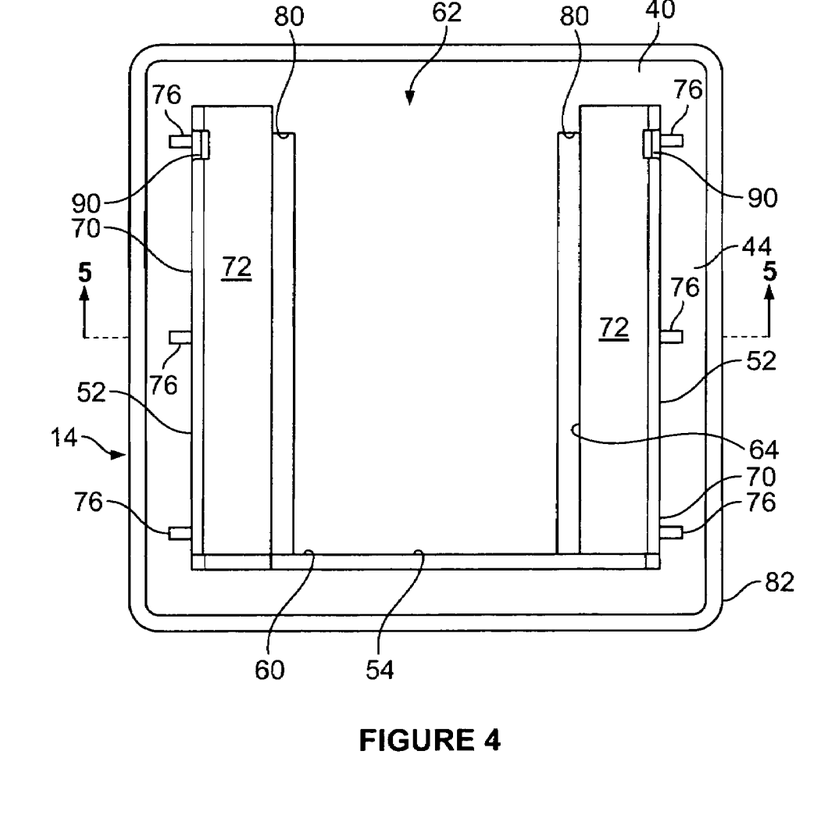
FIG. 4 is a front plan view of one of the cargo restraint devices of FIG. 1.

Each cargo restraint device 14 further includes tamper proofing means comprising a pair of rectangular holes 90 defined on the retaining rails 52 adjacent the open end 62 of the pocket 60 and a tie or cable (not shown) for interconnecting the holes after the cargo bar assembly 12 is engaged with the cargo restraint devices. The tie or cable may include a clamp, or zip tie or include any other structure that cannot be removed without being cut and that cannot be replaced. The tie or cable is secured after the cargo bar assembly 12 is secured in place, extending over the adjustable metal bar 16 and interconnecting the holes 90, to provide tamper proof benefits. Upon arrival of the cargo, the tie or cable can be inspected and, if it has been cut or removed prior to arrival, there is evidence that the cargo has been tampered with during shipment.

The cargo bar assembly 12 may be in the form of any suitable commercially-available cargo bar assembly or have any other suitable construction. In the illustrated embodiment, the length of the adjustable metal bar 16 is adjusted by telescoping the pieces 22 to the desired length and releasably locking the telescoping pieces in place with the releasable lock 24. The cargo bar assembly 12 may include any other suitable structure for adjusting the length of the adjustable metal bar 16 in accordance with other embodiments. The adjustable metal bar 16 may have any other suitable construction in accordance with other embodiments. Further, the cargo bar assembly 12 may instead include an adjustable bar constructed of plastic or any other suitable non-metal material.

Figure 2:
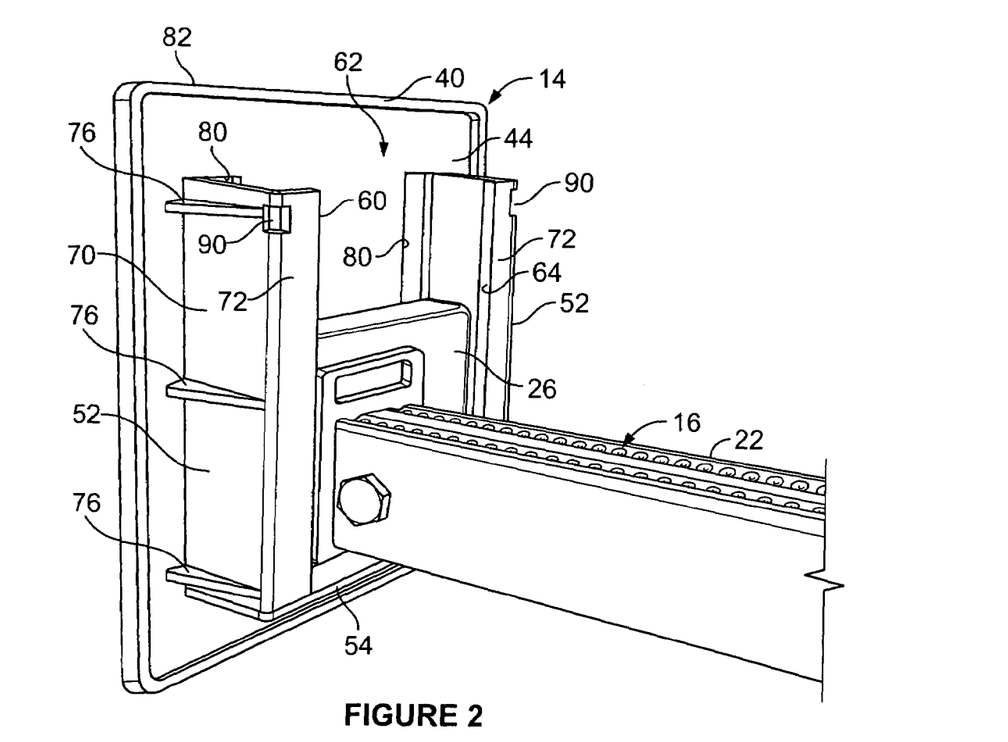
FIG. 2 is an enlarged and broken view of FIG. 1, illustrating one of the cargo restraint devices engaged with one of the flanges of the cargo bar assembly.

The flanges 26 of the cargo bar assembly 12 are generally rectangular and constructed of rubber. The flanges 26, however, may have any other configuration suitable to be retained within the pockets 60 of the cargo restraint devices 14 in accordance with other embodiments. The flanges 26 also may be constructed of any other suitable material in accordance with other embodiments.

The method for restraining cargo within the container in accordance with the present disclosure may include securing one of the cargo restraint devices 14 to one wall of the truck with the adhesive 50; securing another cargo restraint device 14 to the other wall of the truck with the adhesive 50; adjusting the length of the adjustable metal bar 16 of the cargo bar assembly 12 to the desired length; engaging the one cargo restraint device 14 and the one end of the adjustable metal bar 16 of the cargo bar assembly 12 by disposing the flange 26 secured to the one end within the pocket 60 of the one cargo restraint device; engaging the other cargo restraint device 14 and the other end of the adjustable metal bar 16 by disposing the flange 26 secured to the other end within the pocket 60 defined by the other cargo restraint device 14. The step of adjusting the length of the adjustable metal bar 16 to a desired length may be performed prior to securing either or both cargo restraint devices to the walls or may be performed at any other time. Once the adjustable metal bar 16 is engaged with the two cargo restraint devices 14, the length of the bar 16 can be increased to increase the pressure applied to the walls of the container. The walls of the truck or other container may be any opposed structures of the truck or other container, including the opposed lateral sides, the front and back, the top and bottom or any other opposed structures.

Use of the cargo restraint devices 14 with the cargo bar assembly 12 provides many benefits. By way of example, when secured to the opposed walls of a truck or other container without the cargo restraint devices 14, the cargo bar assembly 12 provides holding power as a result of the friction between the flanges of the cargo bar assembly and the walls of the truck. When the cargo bar assembly 12 is secured to the cargo restraint devices 14 in accordance with the present disclosure, however, additional holding power is provided by the cargo restraint devices substantially beyond the holding power provided by the cargo bar assembly 12 itself. With the cargo restraint devices 14, the shear strength of the cargo restraint assembly 10 is substantially greater than the shear strength of the cargo bar assembly 12 itself because of the adhesive. Further, the retaining rails 52 hold the cargo bar assembly 12 in place during movement of the shipping vehicle or the cargo and thereby reduces, if not eliminates, the instances where the cargo bar assembly 12 may become displaced by movement resulting from impact or harmonic vibrations or any other causes.

Figure 6:
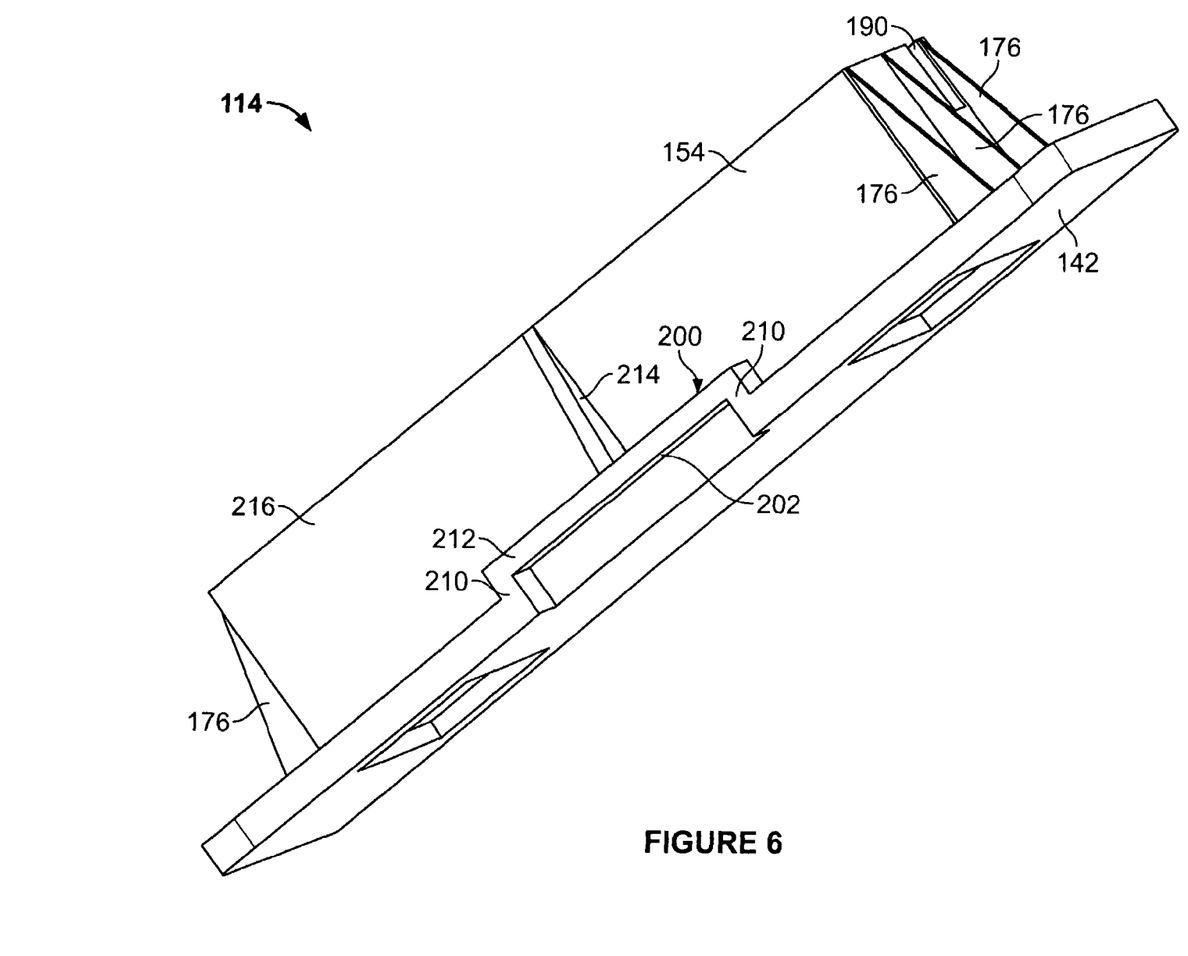
FIG. 6 is a base perspective of a cargo restraint device in accordance with an other embodiment of the present disclosure, including means for readily removing the cargo restraint device from the wall of the truck or other container.
Figure 7:
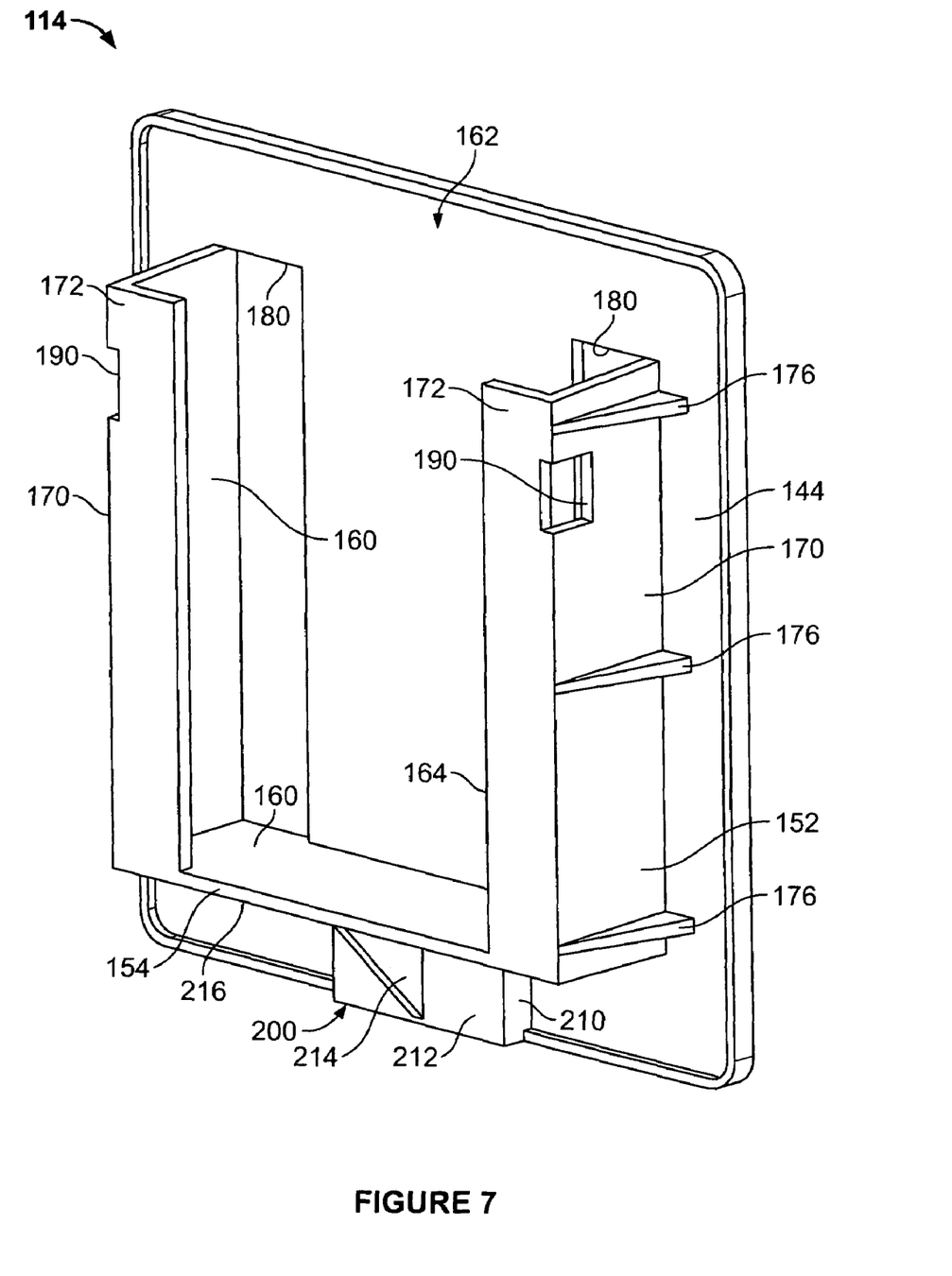
FIG. 7 is a front perspective of the cargo restraint device of FIG. 6.

FIGS. 6 and 7 illustrate another embodiment of the cargo restraint device 114 including means for readily removing the cargo restraint device from the wall. The removal means comprises a removal structure 200 at the base of the cargo restraint device which defines a rectangular void 202. The removal structure 200 comprises a pair of opposed walls 210 interconnected by a contact wall 212. A crowbar, hammer or other tool or the like can be inserted into the void 202 and engaged with the contact wall 212 to readily remove the cargo restraint device 114 from the wall. In the illustrated embodiment, a gusset 214 is formed on the rear 216 of the base rail 154 to increase rigidity. Other than the inclusion of the removal structure 200 and the gusset 214, the structure of the cargo restraint device 114 illustrated in FIGS. 6 and 7 is substantially identical to the structure of the cargo restraint device 14 illustrated in FIGS. 1-5. Accordingly, in referencing in FIGS. 6-7 structure substantially identical to structure in FIGS. 1-5, the same reference numbers from FIGS. 1-5 are used in FIGS. 6-7 except they are changed to 100-series numbers.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the disclosure are desired to be protected. The description and figures are intended as illustrations of embodiments of the disclosure, and are not intended to be construed as having or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A method of restraining cargo within a container with a cargo bar assembly comprising an adjustable bar having a pair of ends and a flange secured to one end, the method comprising:
    (a) securing a cargo restraint device to a wall of the container with adhesive;
    (b) adjusting the length of the adjustable bar of the cargo bar assembly to a desired length;
    (c) engaging the cargo restraint device and the one end of the adjustable bar of the cargo bar assembly by disposing the flange secured to the one end within a pocket defined by the cargo restraint device;
    (d) engaging the other end of the adjustable bar with an other wall of the container;
    (e) adjusting the length of the adjustable bar after (c) and (d) by increasing the length of the adjustable bar to increase pressure applied to the walls of the container; and
    (f) releasably locking the length of the adjustable bar after increasing the length of the adjustable bar to increase pressure applied to the walls of the container.

2. The method of claim 1 wherein the adjustable bar further includes a flange secured to the other end and wherein (d) includes:
    (i) securing an other cargo restraint device to the other wall of the container with adhesive; and
    (ii) engaging the other cargo restraint device and the other end of the adjustable bar of the cargo bar assembly by disposing the flange secured to the other end within a pocket defined by the other cargo restraint device.

3. The method of claim 1 wherein the adjustable bar of the cargo bar assembly is comprised of metal.

4. The method of claim 1 wherein the cargo restraint device includes a front and a rear, the adhesive being associated with the rear, and wherein securing the cargo restraint to the wall includes securing the rear of the cargo restraint to the wall.

5. The method of claim 1 wherein the cargo restraint device includes a front having structure defining an open end of the pocket and wherein (c) includes inserting the flange secured to the one end into the open end of the pocket defined by the cargo restraint device.

6. The method of claim 5 wherein the structure of the cargo restraint device further defines a front opening contiguous with the pocket and wherein (c) further includes sliding the flange secured to the one end into the pocket defined by the cargo restraint device with the adjustable bar of the cargo bar assembly extending through the front opening defined by the cargo restraint device.

7. A method of restraining cargo within a container with a cargo bar assembly comprising an adjustable metal bar having first and second ends and a flange secured to each end, the method comprising:
    (a) securing to a wall of the container a rear surface of a first cargo restraint device by adhesive associated with the rear surface;
    (b) securing to an other wall of the container a rear surface of a second cargo restraint device by adhesive associated with the rear surface;
    (c) adjusting the length of an adjustable metal bar of the cargo bar assembly to a desired length;
    (d) engaging the first cargo restraint device and the first end of the adjustable metal bar of the cargo bar assembly by disposing the flange secured to the first end within a pocket defined by the first cargo restraint device;
    (e) engaging the second cargo restraint device and the second end of the adjustable metal bar of the cargo bar assembly by disposing the flange secured to the second end within a pocket defined by the second cargo restraint device;
    (f) adjusting the length of the adjustable metal bar after (d) and (e) by increasing the length of the adjustable metal bar to increase pressure applied to the walls of the container and to place the adjustable metal bar in compression; and
    (g) releasably locking the length of the adjustable metal bar after increasing the length of the adjustable metal bar to increase pressure applied to the walls of the container and to place the adjustable metal bar in compression.

8. The method of claim 7 wherein each of the first and second cargo restraint devices includes a front having structure defining an open end of the pocket, wherein (d) further includes inserting the flange secured to the first end into the open end of the pocket defined by the first cargo restraint device; and wherein (e) further includes inserting the flange secured to the second end into the open end of the pocket defined by the second cargo restraint device.

9. The method of claim 8 wherein the structure of each of the first and second cargo restraint devices further defines a front opening contiguous with the pocket, wherein (d) further includes sliding the flange secured to the first end into the pocket defined by the first cargo restraint device with the adjustable metal bar of the cargo bar assembly extending through the front opening, and wherein (e) further includes sliding the flange secured to the second end into the open end of the pocket defined by the second cargo restraint device with the adjustable metal bar of the cargo bar assembly extending through the front opening.

10. A method of restraining cargo within a container with a cargo bar assembly comprising an adjustable metal bar having first and second ends and a flange secured to each end, the method comprising:
    (a) securing to a wall of the container a rear surface of a first cargo restraint device by adhesive associated with the rear surface;
    (b) securing to an other wall of the container a rear surface of a second cargo restraint device by adhesive associated with the rear surface;
    (c) adjusting the length of the adjustable metal bar of the cargo bar assembly to a desired length;
    (d) engaging the first cargo restraint device and the first end of the adjustable metal bar of the cargo bar assembly by inserting the flange secured to the first end into and open end of a pocket defined by a front of the first cargo restraint device and sliding the flange into the pocket with the first cargo restraint device extending though a front opening defined by the front of the first cargo restraint device;

(e) engaging the second cargo restraint device and the second end of the adjustable metal bar of the cargo restraining device by inserting the flange secured to the second end into an open end of a pocket defined by a front of the second cargo restraint device and sliding the flange into the pocket with the adjustable bar of the cargo bar assembly extending though a front opening defined by the front of the second cargo restraint device;

(f) adjusting the length of the adjustable metal bar after (d) and (e) by increasing the length of the adjustable metal bar to increase pressure applied to the walls of the container; and (g) releasably locking the length of the adjustable metal bar after increasing the length of the adjustable metal bar to increase pressure applied to the walls of the container and to place the adjustable metal bar in compression.

11. A cargo restraint assembly for restraining cargo within a container having a pair of opposed walls, the cargo restraint assembly comprising:

(a) a cargo bar assembly comprising an adjustable bar having two ends and a flange on each end and including structure for adjusting the length of the adjustable bar and for releasably locking the bar at a desired length and holding the bar in compression between the two ends;

(b) a pair of cargo restraint devices for securing to the opposed walls of the container, each cargo restraint device comprising a rear surface for engaging a respective wall, an adhesive associated with the rear surface, and a front defining a pocket having an open end for receivably securing a respective flange to the cargo restraint device and a front opening contiguous with the pocket for receiving the adjustable bar of the cargo bar assembly.

12. The cargo restraint assembly of claim 11 wherein the adjustable bar comprises metal.

13. The cargo restraint assembly of claim 11 wherein the front of each cargo restraint device comprises a pair of retaining rails defining the pocket and the front opening, each retaining rail including a rear engaging surface for engaging the respective flange for securing the respective flange to the cargo restraint device.

14. The cargo restraint assembly of claim 13 wherein the retaining rails of each cargo restraint device extend parallel to the rear surface of the cargo restraint device.

15. The cargo restraint assembly of claim 13 wherein each of the retaining rails has an L-shaped cross section.

16. The cargo restraint assembly of claim 15 wherein the front of each cargo restraint device includes a base rail for supporting the respective flange when the respective flange is secured to the cargo restraint device.

17. The cargo restraint assembly of claim 11 wherein the front of each cargo restraint device comprises a pair of parallel retaining rails and a base rail defining the pocket and the front opening, the base rail extending perpendicular to the retaining rails and being opposite the open end of the pocket.

18. The cargo restraint assembly of claim 11 wherein each cargo restraint device includes removal structure defining a void to facilitate removal of the cargo restraint device from the respective wall.

19. A cargo restraint device for restraining cargo within a container with a cargo bar assembly comprising an adjustable bar having at least one end and a flange on the end and including structure for adjusting the length of the adjustable bar and for releasably locking the bar at a desired length and holding the bar in compression between the two ends, the cargo restraint device comprising a rear surface for engaging a wall of the container, adhesive associated with the rear surface, and a front defining a pocket having an open end for receivably securing the flange and a front opening contiguous with the pocket for receiving the adjustable bar, the front comprising a pair of retaining rails defining the pocket and the front opening, each retaining rail including a rear engaging surface for engaging the flange for securing the flange.

20. The cargo restraint device of claim 19 wherein each of the retaining rails has an L-shaped cross section.

21. The cargo restraint device of claim 19 wherein the front includes a base rail for supporting the flange when the flange is received by the pocket.

22. The cargo restraint device of claim 21 wherein the base rail extends perpendicular to the retaining rails and is disposed opposite the open end of the pocket.

23. The cargo restraint device of claim 19 further including removal structure defining a void to facilitate removal of the cargo restraint device from the wall.

* * * * *